United States Patent
Jensen et al.

(10) Patent No.: US 6,986,553 B2
(45) Date of Patent: Jan. 17, 2006

(54) WHEEL ORNAMENTATION ASSEMBLY

(75) Inventors: Eric Earl Jensen, Oxford, MI (US); Roger Andrew Renaud, Milford, MI (US); David Browning Ferriss, Novi, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 10/107,643

(22) Filed: Mar. 27, 2002

(65) Prior Publication Data

US 2003/0184146 A1   Oct. 2, 2003

(51) Int. Cl.
   *B60B 7/06*   (2006.01)
(52) U.S. Cl. ............. 301/37.31; 301/37.32; 301/37.371; 301/108.4
(58) Field of Classification Search ........ 301/37.31, 301/37.32, 37.33, 37.42, 37.376, 108.1, 108.2, 301/108.4
   See application file for complete search history.

(56) References Cited

U.S. PATENT DOCUMENTS

| | | | |
|---|---|---|---|
| 4,458,952 A * | 7/1984 | Foster et al. ............. | 301/37.32 |
| 4,547,021 A * | 10/1985 | Abbate Daga ............ | 301/37.42 |
| 5,161,860 A * | 11/1992 | Sakane ..................... | 301/37.42 |
| 5,163,739 A * | 11/1992 | Stanlake ................. | 301/37.371 |
| 5,249,845 A * | 10/1993 | Dubost ................... | 301/37.371 |
| 5,297,854 A * | 3/1994 | Nielsen et al. ......... | 301/37.371 |
| 5,368,370 A | 11/1994 | Beam | |
| 5,845,973 A | 12/1998 | Chase | |
| 6,022,081 A | 2/2000 | Hauler et al. | |
| 6,238,007 B1 | 5/2001 | Wieczorek et al. | |
| 6,402,254 B1 | 6/2002 | Eikhoff et al. | |
| 6,457,781 B1 * | 10/2002 | Cutcher et al. ......... | 301/37.371 |

* cited by examiner

*Primary Examiner*—Russell D. Stormer
(74) *Attorney, Agent, or Firm*—Butzel Long

(57) ABSTRACT

A wheel ornamentation assembly is provided for attachment to a wheel secured to a wheel hub with a plurality of lug nuts. The wheel ornamentation assembly includes a wheel ornamentation having an outboard surface and an inboard surface. The wheel ornamentation assembly also includes a plurality of retention legs extending axially from the inboard surface for engaging the lug nuts. The wheel ornamentation also includes a wire retainer cooperating with the retention legs to provide mechanical support to the retention legs and prevent the wheel ornamentation from disengaging the lug nuts.

9 Claims, 4 Drawing Sheets

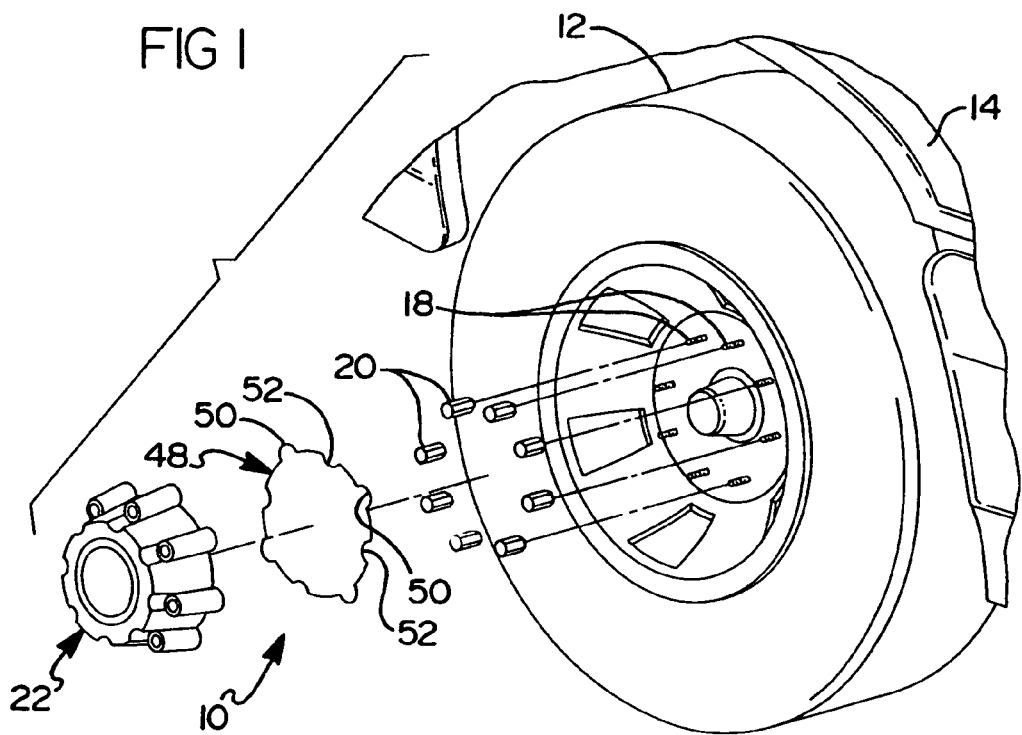
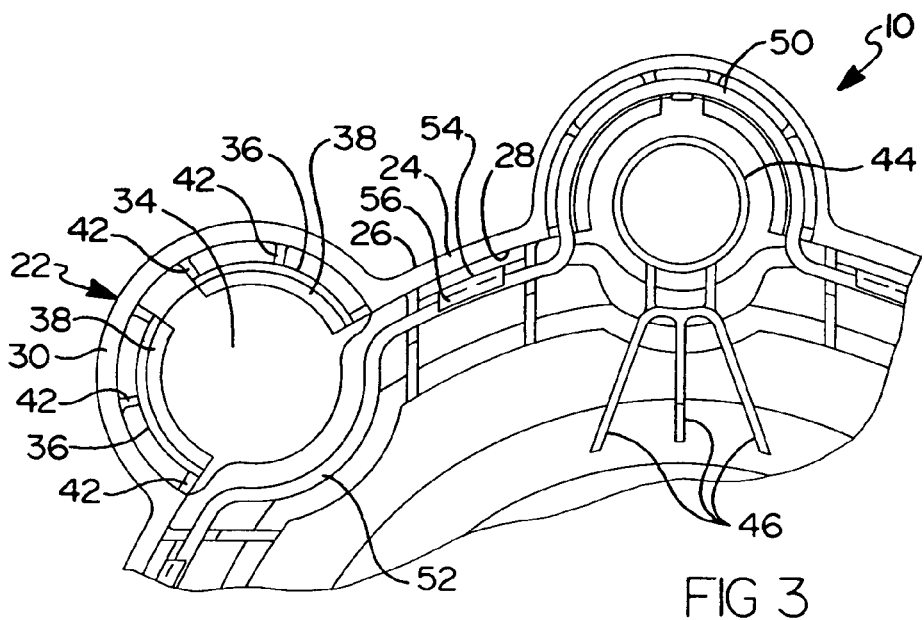

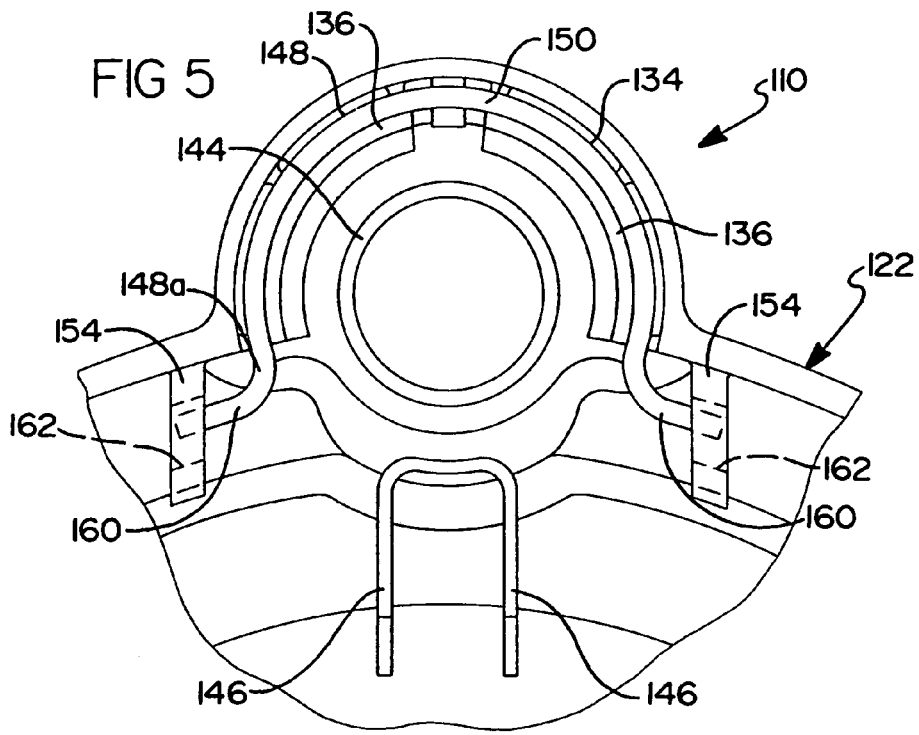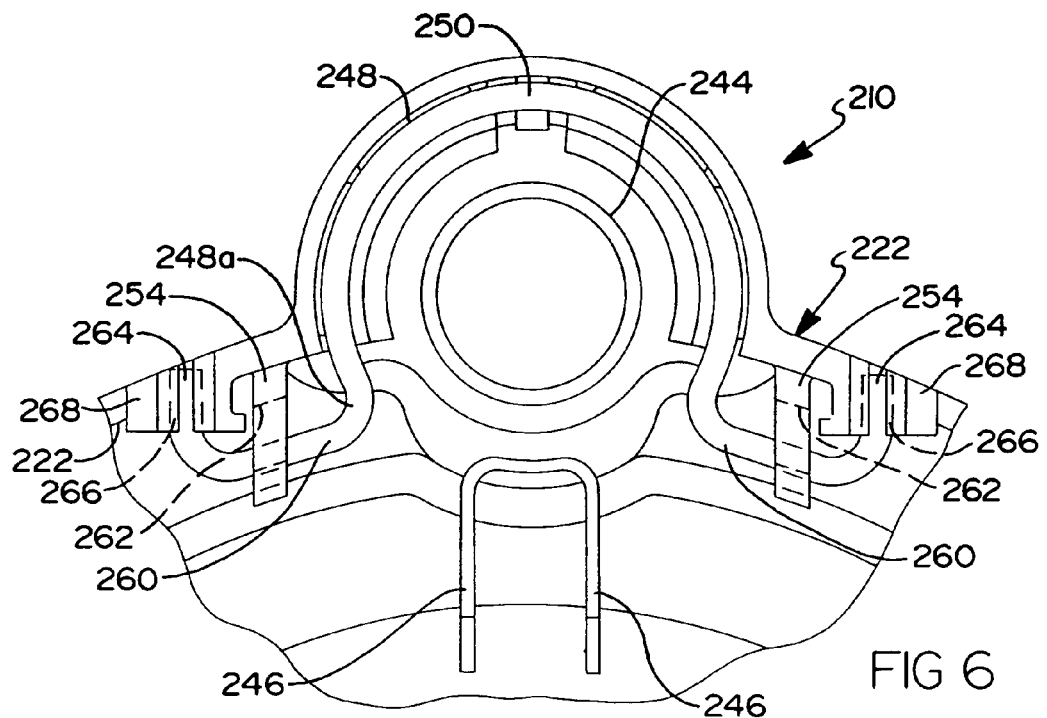

WHEEL ORNAMENTATION ASSEMBLY

BACKGROUND OF THE INVENTION

1. Field of the Invention

The present invention relates generally to wheels for vehicles and, more specifically, to a wheel ornamentation assembly for wheels of a vehicle.

2. Description of the Related Art

It is known to provide wheel ornamentation such as wheel caps and wheel covers for wheels of a vehicle such as an automotive vehicle to enhance appearance of the wheels. Wheel ornamentation is used because it is less expensive to manufacture, finish, and mount the wheel ornamentation to the wheel than to manufacture the wheel with the same quality finish of the wheel ornamentation. A chrome surface on the wheel ornamentation is an inexpensive alternative to a chrome plated or polished wheel. In addition, wheel ornamentation provide various types of appearances and styling variations, all of which may be combined with a single wheel design.

It is also known to manufacture the wheel ornamentation of a plastic material and attach the plastic wheel ornamentation to lug nuts of the wheel. An example of such a wheel ornamentation is disclosed in U.S. Pat. No. 6,022,081 to Hauler et al. In this patent, an ornamental wheel cover is provided with a number of elongated tubular extensions axially projecting from the cover that are each partially slotted to provide cantilevered fingers. Each finger has an undercut groove that has a shoulder, which positively positions the cover to an upper shoulder of the lug nuts of the wheel. Below the undercut groove is a bulbous portion that contacts the lug nut below the flange and engages the underside of the flange, thereby retaining the cover on the lug nut.

One disadvantage of the above plastic wheel ornamentation is that the lug nuts are heated by the wheel as the wheel rotates, thereby heating the extensions of the plastic wheel ornamentation. As a result, the heated plastic relaxes, causing the retention force of the extensions to decrease. The decreased retention force of the extensions may result in the wheel ornamentation disengaging the wheel.

Therefore, it is desirable to provide a retainer for a plastic wheel ornamentation to assist in retaining the wheel ornamentation to a wheel of a vehicle. It is also desirable to provide a retainer for a plastic wheel ornamentation to retain the wheel ornamentation to a wheel that adjusts tension for retaining the wheel ornamentation to the wheels. It is further desirable to provide a retainer that provides mechanical support for plastic wheel ornamentation to retain the wheel ornamentation to a wheel of a vehicle. Therefore, there is a need in the art to provide a wheel ornamentation assembly that meets these desires.

SUMMARY OF THE INVENTION

Accordingly, the present invention is a wheel ornamentation assembly for attachment to a wheel secured to a wheel hub with a plurality of lug nuts. The wheel ornamentation assembly includes a wheel ornamentation having an outboard surface and an inboard surface. The wheel ornamentation assembly also includes a plurality of retention legs extending axially from the inboard surface for engaging the lug nuts. The wheel ornamentation also includes a wire retainer cooperating with the retention legs to provide mechanical support to the retention legs and prevent the wheel ornamentation from disengaging the lug nuts.

One advantage of the present invention is that a wheel ornamentation assembly is provided for a wheel of a vehicle. Another advantage of the present invention is that the wheel ornamentation assembly has a wire retainer that provides mechanical support for plastic wheel ornamentation, without which the plastic wheel ornamentation would relax under stress and/or heat. Yet another advantage of the present invention is that the wheel ornamentation assembly includes a wire retainer that provides unlimited adjustability with respect to how tightly the wheel ornamentation grips the lug nuts, allowing adjustable installation force and removal force. Still another advantage of the present invention is that the wheel ornamentation assembly includes a wire retainer that provides the ability to be used with all decorative finishes including paint, plate, or mold-in-color and does not rely on chrome plating to provide stiffness to the plastic retention legs. A further advantage of the present invention is that the wheel ornamentation assembly includes a wire retainer can be a single piece or multiple pieces with individual wires surrounding each lug nut independently. Yet a further advantage of the present invention is that the wheel ornamentation assembly has a hybrid plastic/wire retention that gives benefits of an all-metal retainer (heat resistance, creep resistance, stiffness) with the lower tooling costs of plastic molding. Still a further advantage of the present invention is that the wheel ornamentation assembly has plastic legs that grip on the outside of a two-piece lug nut and surround the lug nut by just over 180 degrees. Another advantage of the present invention is that the wheel ornamentation assembly has round stand-off features which contact the top of the lug nuts, preventing over-installation with the force distributed more evenly than if multiple ribs were used. Yet another advantage of the present invention is that the wheel ornamentation assembly has centering ribs that allow the wheel ornamentation to be easily centered on the wheel hub for easy location of part. Still another advantage of the present invention is that the wheel ornamentation assembly has centering ribs that act as side-load carriers to aid in supporting customer weight if the wheel ornamentation is used as a step for a customer to reach windshield, truck bed, etc., of the vehicle.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is an exploded view of a wheel ornamentation assembly, according to the present invention, illustrated in operational relationship with a wheel of a vehicle.

FIG. 3 is a partial elevational view of a portion of the wheel ornamentation assembly of FIG. 1.

FIG. 5 is a partial elevational view of another embodiment, according to the present invention, of the wheel ornamentation assembly of FIG. 1.

FIG. 6 is a partial elevational view of yet another embodiment, according to the present invention, of the wheel ornamentation assembly of FIG. 1.

DESCRIPTION OF THE PREFERRED EMBODIMENT(S)

Figure 2:
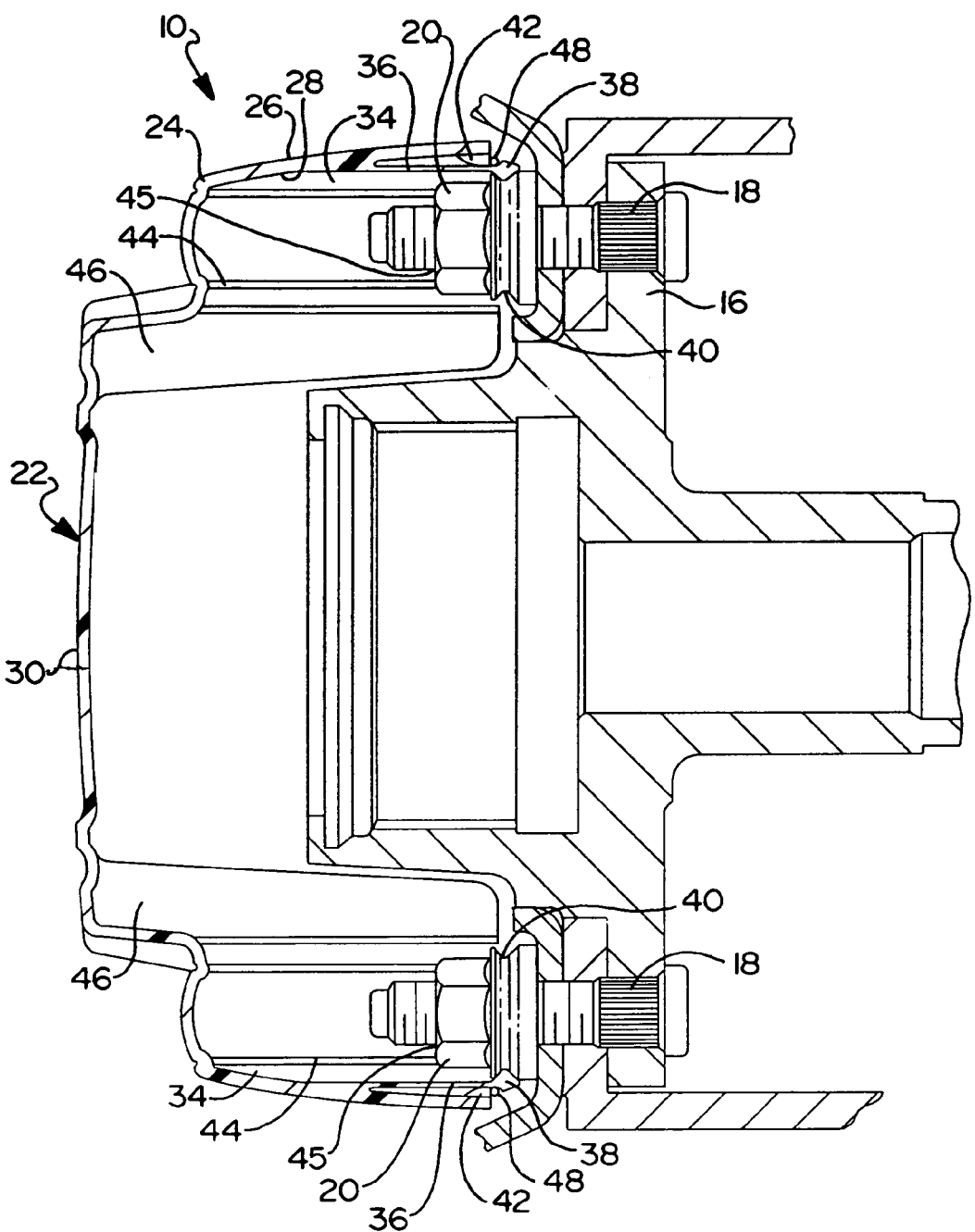
FIG. 2 is a sectional view of the wheel ornamentation assembly and wheel of FIG. 1.
Figure 4:
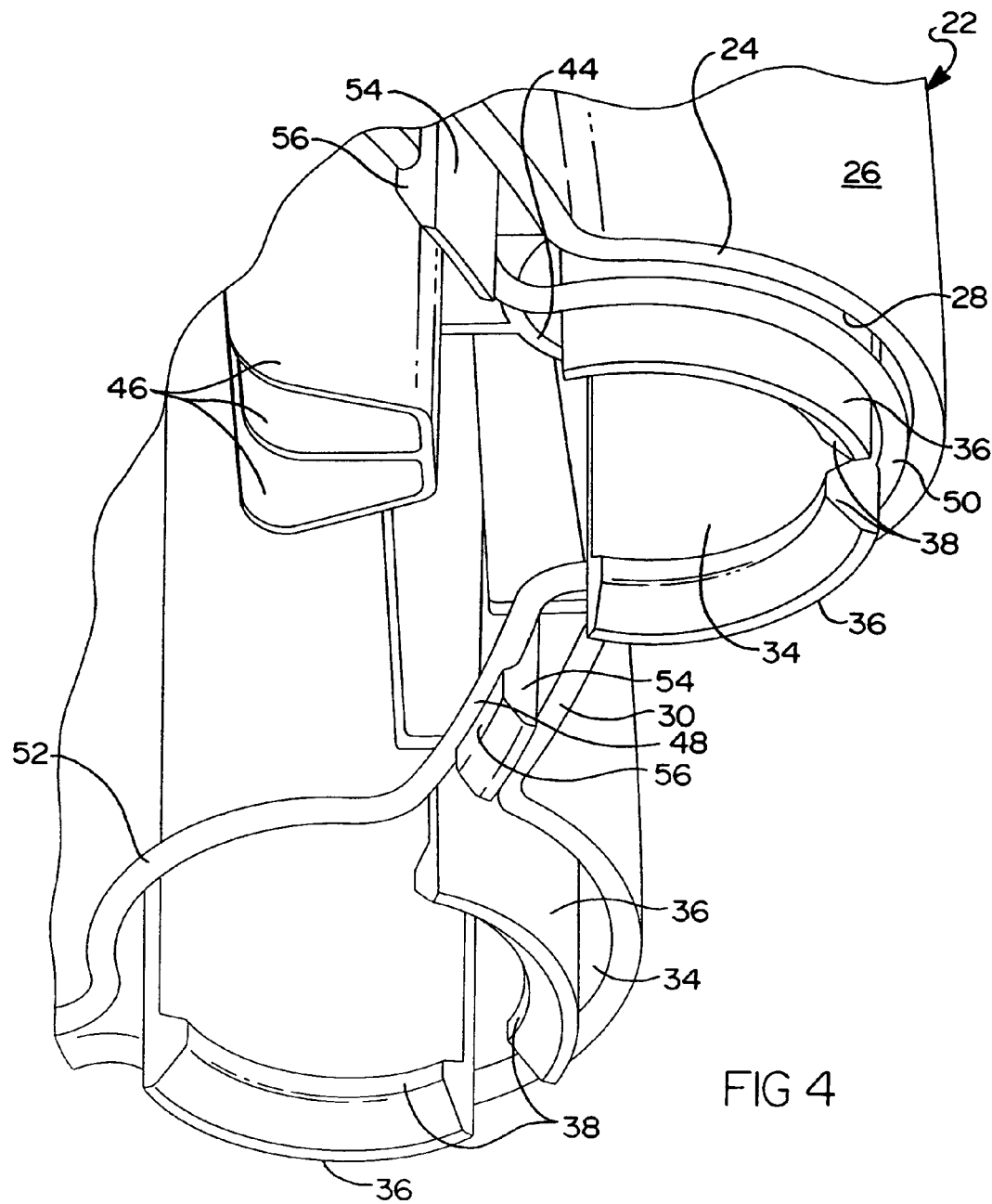
FIG. 4 is a partial perspective view of a portion of the wheel ornamentation assembly of FIG. 1.

Referring to the drawings and in particular FIGS. 1 and 2, one embodiment of a wheel ornamentation assembly 10, according to the present invention, is shown for a wheel 12 of a vehicle 14 such as an automotive vehicle. The vehicle 14 has at least one wheel hub 16 with a plurality of lug studs 18 extending axially therefrom. The wheel 12 is secured to the wheel hub 16 with a plurality of lug nuts 20 which threadingly engage the lug studs 18. The wheel ornamentation assembly 10 is attached to the lug nuts 20 in a manner to be described to cover the lug nuts 20. It should be appreciated that, except for the wheel ornamentation assembly 10, the wheel 12 and vehicle 14 are conventional and known in the art.

The wheel ornamentation assembly 10 includes a wheel ornamentation, generally indicated at 22, for attachment to the lug nuts 20. In the embodiment shown, the wheel ornamentation 22 is a wheel cap. The wheel ornamentation 22 has a wall 24 with an outboard surface 26 and an inboard surface 28. The wheel ornamentation 22 is generally cylindrical in shape and the wall 24 forms a closed end 30 extending axially to an open end 32. The wheel ornamentation 22 further has at least one, preferably a plurality of lug cavities 34 formed by the wall 24 and spaced circumferentially. The lug cavities 34 are generally cylindrical in shape and correspond to the lug studs 18 of the wheel hub 16 to receive the lug nuts 20. It should be appreciated that there is one lug cavity 34 for every lug nut 20. It should also be appreciated that the outboard surface 26 typically matches the appearance of the wheel 12 or a wheel cover (not shown). It should further be appreciated that the wheel ornamentation 22 could be some other wheel ornamentation such as a wheel cover (not shown).

The wheel ornamentation 22 also includes a plurality of retention legs 36 extending axially from the inboard surface 28. The retention legs 36 have a cross-section that extends through an arcuate path. A pair of the retention legs 36 is disposed in each lug cavity 34 and spaced circumferentially about each lug nut 20. The pair of retention legs 36 surrounds the lug nut 20 by just over one hundred eighty degrees (180°). Each of the retention legs 36 have a first end connected to the inboard surface 28 and extend axially to a second end that extends past the open end 30. Each of the retention legs 36 includes a flange 38 at the second end extending radially to engage a portion of the lug nuts 20. In the embodiment illustrated, the flange 38 is received in a groove 40 of the lug nuts 20 to attach and retain the wheel ornamentation 22 to the lug nuts 20. The second end of the retention legs 36 is spaced radially from the wall 24 at the open end 30. Each of the retention legs 36 is biased inwardly by at least one, preferably a plurality of ribs 42 extending radially from the inboard surface 28 of the wall 24 at the open end 30 to resiliently engage the lug nuts 20 such that the wheel ornamentation 22 is secured to the wheel 14. It should be appreciated that the retention legs 36 flex to be disposed over the lug nuts 20 such that the flange 38 is received in the groove 40.

The wheel ornamentation 22 also includes at least one, preferably a plurality of standoffs 44 extending axially from the inboard surface 28. The standoffs 44 are generally tubular in shape and have a generally circular or round cross-section. One standoff 44 is disposed in one of the lug cavities 34. Preferably, the standoffs 44 are disposed in an alternating manner in the lug cavities 34. In the lug cavity 34, the standoff 44 is spaced radially from the retention legs 36 in the lug cavity 34. The standoff 44 extends axially from the inboard surface 28 and terminates before the second end of the retention legs 36 to engage or contact a top portion 45 of the lug nut 20. It should be appreciated that the standoffs 44 prevent over-installation of the wheel ornamentation 22 to the wheel 12 with the force distributed more evenly.

The wheel ornamentation 22 includes at least one, preferably a plurality of centering ribs 46 extending from the inboard surface 20 of the wall 24 at the closed end 30. Preferably, three centering ribs 46 extend from the inboard surface 28 and along each standoff 44. The centering ribs 46 extend axially along the standoff 44 and radially outwardly to engage the wheel hub 16. The centering ribs 46 are spaced circumferentially from each other along the standoff 44. It should be appreciated that the centering ribs 46 allow the wheel ornamentation 22 to be easily centered on the wheel hub 16 for easy location of the wheel ornamentation 22. It should also be appreciated that the centering ribs 46 also act as side-load carriers to aid in supporting customer weight if the wheel ornamentation 22 is used as a step for a person to reach a windshield, bed, etc., of the vehicle 14.

The wheel ornamentation 22 is made of a plastic material. Conventional injection molding forms the wheel ornamentation 22. The wheel ornamentation 22 is a monolithic structure being integral, unitary, and one-piece. It should be appreciated that the retention legs 36 are made of the plastic material.

The wheel ornamentation assembly 10 also includes a wire retainer, generally indicated at 48, to provide mechanical support for the retention legs 36. The wire retainer 48 is generally circular in shape with a generally circular cross-section. The wire retainer 48 includes at least one, preferably a plurality of convex portions 50 extending outwardly and at least one, preferably a plurality of concave portions 52 extending inwardly therein. As illustrated, the convex portions 50 and concave portions 52 are spaced circumferentially and in an alternating manner to correspond with each of the lug cavities 34. The convex portions 50 and concave portions 52 are generally arcuate in shape. The convex portions 50 are disposed about the retention legs 36 in their respective lug cavity 34 between the wall 24 and the retention legs 36 and below the flanges 38. The concave portions 52 are disposed opposite the retention legs 36 in their respective lug cavity 34 to form a three hundred sixty degree (360°) enclosure with the retention legs 36. The wire retainer 48 is secured to the wheel ornamentation 22 by at least one, preferably a plurality of retention arms 54 extending axially from the inboard surface 28. The retention arms 54 are disposed between the lug cavities 34 and spaced circumferentially about the wheel ornamentation 22. Each of the retention arms 54 have a first end connected to the inboard surface 28 and extend axially to a second end that extends past the open end 30. Each of the retention arms 54 includes a flange 56 extending radially to engage a portion of the wire retainer 48. In the embodiment illustrated, the wire retainer 48 is disposed below the flange 56 to attach and retain the wire retainer 48 to the wheel ornamentation 22. It should be appreciated that the retention arms 54 flex to allow the wire retainer 48 to be disposed therebetween such that the flange 56 overlaps the wire retainer 48.

The wire retainer 48 is made of a metal material such as steel. In the embodiment illustrated in FIGS. 1 through 4, the wire retainer 48 is a single member being continuous and forming a closed loop. The wire retainer 48 provides a spring force to keep the retention legs 36 in place on the lug nuts 20. The wire retainer 48 entraps the retention legs 36 and resists deformation. The tension of the wire retainer 48 is adjusted by varying the dimensions of the thickness, shape, and material of the wire retainer 48. It should be appreciated that, without the wire retainer 48, the plastic retention legs 36 would relax under stress and/or heat. It should also be appreciated that the wire retainer 48 provides unlimited adjustability with respect to how tightly the wheel ornamentation 22 grips the lug nuts 20, allowing adjustable installation force and removal force. It should further be appreciated that the wire retainer 48 can be used with the wheel ornamentation 22 of various finishes including paint, plate, or mold-in-color.

To assemble the wheel ornamentation assembly 10, the retention arms 54 are flexed by the wire retainer 48 to dispose the wire retainer 48 between the retention arms 54 such that the flange 56 overlaps the wire retainer 48. The wheel ornamentation assembly 10 is then aligned with the lug nuts 20 on the wheel studs 18. The wheel ornamentation assembly 10 is moved toward the lug nuts 20 such that the retention legs 36 are flexed to receive the lug nuts 20 and the flanges 38 are disposed in the grooves 40 of the lug nuts 20. The standoffs 44 engage the top portion 45 of the lug nuts 20 to prevent over-travel of the wheel ornamentation 22. The centering ribs 46 center the wheel ornamentation 22 on the wheel hub 16. When the lug nuts 20 are heated due to rotation of the wheel 12, the wire retainer 48 provides mechanical support to the retention legs 36 to retain the flanges 38 in the grooves 40 of the lug nuts 20.

Referring to FIG. 5, another embodiment, according to the present invention, of the wheel ornamentation assembly 10 is shown. Like parts of the wheel ornamentation assembly 10 have like reference numerals increased by one hundred (100). In this embodiment, the wheel ornamentation assembly 110 includes the wheel ornamentation 122 and the wire retainer 148 is a plurality of individual wire members 148a surrounding each lug cavity 134 independently. Each wire member 148a has a convex portion 150 and an arm portion 160 extending outwardly from each side of the convex portion 150. The retention arms 154 eliminate the flange and include an aperture 162 extending therethrough. The convex portion 150 surrounds the retention legs 136 and the arm portions 160 extend through the apertures 162 in the retention arms 154 on opposed sides of the lug cavity 134. The operation of the wheel ornamentation assembly 110 is similar to the operation of the wheel assembly 10. It should be appreciated that the wheel ornamentation assembly 110 includes the standoffs 144 and the centering ribs 146.

Referring to FIG. 6, yet another embodiment, according to the present invention, of the wheel ornamentation assembly 10 is shown. Like parts of the wheel ornamentation assembly 10 have like reference numerals increased by two hundred (200). In this embodiment, the wheel ornamentation assembly 210 includes the wheel ornamentation 222 and the wire retainer 248 is a plurality of individual wire members 248a surrounding each lug cavity 134 independently. Each wire member 248a has a convex portion 250 and an arm portion 260 extending outwardly from each side of the convex portion 150. Each wire member 248a also has a retention portion 264 extending generally perpendicular from each arm portion 260. The retention arms 254 eliminate the flange and include an aperture 262 extending therethrough. The convex portion 250 surrounds the retention legs 236 and the arm portions 260 extend through the apertures 262 in the retention arms 254 on opposed sides of the lug cavity 234. The retention portions 264 extend into recesses 266 of projections 268 extending radially from the inboard surface 228 of the wheel ornamentation 222. The operation of the wheel ornamentation assembly 210 is similar to the operation of the wheel assembly 10. It should be appreciated that the wheel ornamentation assembly 210 includes the standoffs 244 and the centering ribs 246.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wheel ornamentation assembly for attachment to a wheel secured to a wheel hub with a plurality of lug nuts, said wheel ornamentation assembly comprising:
   a wheel ornamentation made of a plastic material having an outboard surface and an inboard surface;
   a pair of retention legs extending axially from said inboard surface for engaging the lug nuts;
   a wire retainer cooperating with said retention legs to provide mechanical support to said retention legs and prevent said wheel ornamentation from disengaging the lug nuts; and
   a plurality of retention arms extending from said inboard surface to secure said wire retainer to said wheel ornamentation.

2. A wheel ornamentation assembly as set forth in claim 1 including a plurality of standoffs extending axially from said inboard surface, one of said standoffs adapted for engaging a top surface of one of the lug nuts.

3. A wheel ornamentation assembly as set forth in claim 1 wherein said standoffs are circular in shape for contacting the top of the lug nuts.

4. A wheel ornamentation assembly as set forth in claim 1 including a plurality of centering ribs extending axially from said inboard surface to center said wheel ornamentation relative to the wheel hub of the wheel.

5. A wheel ornamentation assembly as set forth in claim 1 wherein said wire retainer is a single member forming a closed loop.

6. A wheel ornamentation assembly as set forth in claim 1 wherein said wire retainer comprises a plurality of individual members, one of said members surrounding each of the lug nuts independently.

7. A wheel ornamentation assembly as set forth in claim 1 wherein said wire retainer has at least one convex portion cooperating with said retention legs.

8. A wheel ornamentation assembly as set forth in claim 1 wherein said wire retainer is made of a metal material.

9. A wheel assembly for a vehicle comprising:
   a wheel adapted to be secured to a wheel hub with a plurality of lug nuts;
   a wheel ornamentation fbr covering a portion of said wheel and made of a plastic material having an outboard surface and an inboard surface;
   a plurality of retention legs extending axially from said inboard surface for engaging the lug nuts;
   a wire retainer made of a metal material and cooperating with said retention legs to provide mechanical support to said retention legs and prevent said wheel ornamentation from disengaging the lug nuts; and
   wherein said wire retainer includes a plurality of convex portions extending outwardly and at least one concave portion extending inwardly and being disposed between said convex portions, said convex portions adapted to operatively engage at least one pair of said retention legs.

* * * * *